United States Patent
Hentsch

(10) Patent No.: US 7,263,635 B2
(45) Date of Patent: Aug. 28, 2007

(54) METHOD AND DEVICE AS WELL AS A CONTROL UNIT FOR MONITORING A BUS SYSTEM

(75) Inventor: Ingmar Hentsch, Wuppertal (DE)

(73) Assignee: Robert Bosch GmbH, Stuttgart (DE)

( * ) Notice: Subject to any disclaimer, the term of this patent is extended or adjusted under 35 U.S.C. 154(b) by 616 days.

(21) Appl. No.: 10/256,649

(22) Filed: Sep. 26, 2002

(65) Prior Publication Data
US 2004/0078714 A1   Apr. 22, 2004

(30) Foreign Application Priority Data
Sep. 26, 2001   (DE) ................ 101 47 442

(51) Int. Cl.
*G06F 11/00*   (2006.01)
(52) U.S. Cl. ................ 714/47; 340/426.28; 340/542; 180/287; 307/10.2
(58) Field of Classification Search .......... 340/426.26, 340/428; 714/47
See application file for complete search history.

(56) References Cited

U.S. PATENT DOCUMENTS

| | | | | |
|---|---|---|---|---|
| 5,583,486 | A * | 12/1996 | Kersten | 340/572.1 |
| 5,719,551 | A * | 2/1998 | Flick | 340/426.25 |
| 5,850,173 | A * | 12/1998 | DiCroce et al. | 340/426.25 |
| 6,628,196 | B1 * | 9/2003 | Flick | 340/426.13 |
| 6,819,229 | B2 * | 11/2004 | Ghabra et al. | 340/426.36 |
| 6,871,250 | B2 * | 3/2005 | Froeschl et al. | 710/110 |
| 6,891,312 | B2 * | 5/2005 | Budzynski | 310/324 |
| 2002/0071484 | A1 * | 6/2002 | Spichale | 375/238 |
| 2003/0158983 | A1 * | 8/2003 | Dalakuras et al. | 710/107 |
| 2004/0075538 | A1 * | 4/2004 | Flick | 340/426.1 |
| 2004/0090122 | A1 * | 5/2004 | Huber et al. | 307/10.2 |

FOREIGN PATENT DOCUMENTS

| | | |
|---|---|---|
| DE | 195 30 719 | 2/1997 |
| DE | 195 30 726 | 2/1997 |
| DE | 198 40 484 | 3/2000 |
| DE | 19958564 A1 * | 6/2001 |
| EP | 0 624 959 | 11/1994 |

OTHER PUBLICATIONS

Machine translation of German Patent DE19958564 provided by http://bablefish.altavista.com/ on Aug. 31, 2005.*

(Continued)

*Primary Examiner*—Robert Beausoliel
*Assistant Examiner*—Philip Guyton
(74) *Attorney, Agent, or Firm*—Kenyon & Kenyon LLP

(57) ABSTRACT

A method for monitoring a bus system having at least three users in a vehicle having a drive unit and a lockable vehicle interior; of the at least three users of the bus system, precisely one first user being formed as the superordinate user and initiating each data transmission on the bus system; at least one second user being formed as an element of a locking system in a vehicle, and at least one third user being arranged outside of the lockable vehicle interior, wherein the first user monitors the data transmission such that in at least one specific operating state of the vehicle and/or the bus system, the first user, for each data transmission on the bus system that was not initiated by it, introduces measures to prevent transmission of the data.

8 Claims, 1 Drawing Sheet

OTHER PUBLICATIONS

DeNuto et al. "LIN bus and its potential for use in distributed multiplexer applications." SAE 2001 World Congress. Detroit, MI, Mar. 5-8, 2001.*

Translation of German Patent DE19958564 provided by Schreiber Translations, Inc.*

J.W. Specks, et al., "Lin—Protokoll Entwicklungswerkzeuge und Software—Schnittstelle fur lokale Datennetzwerke im Kraftfahrzeug", VDI-Verlag Gmbh, Dusseldorf, Oct. 5, 2000.

* cited by examiner

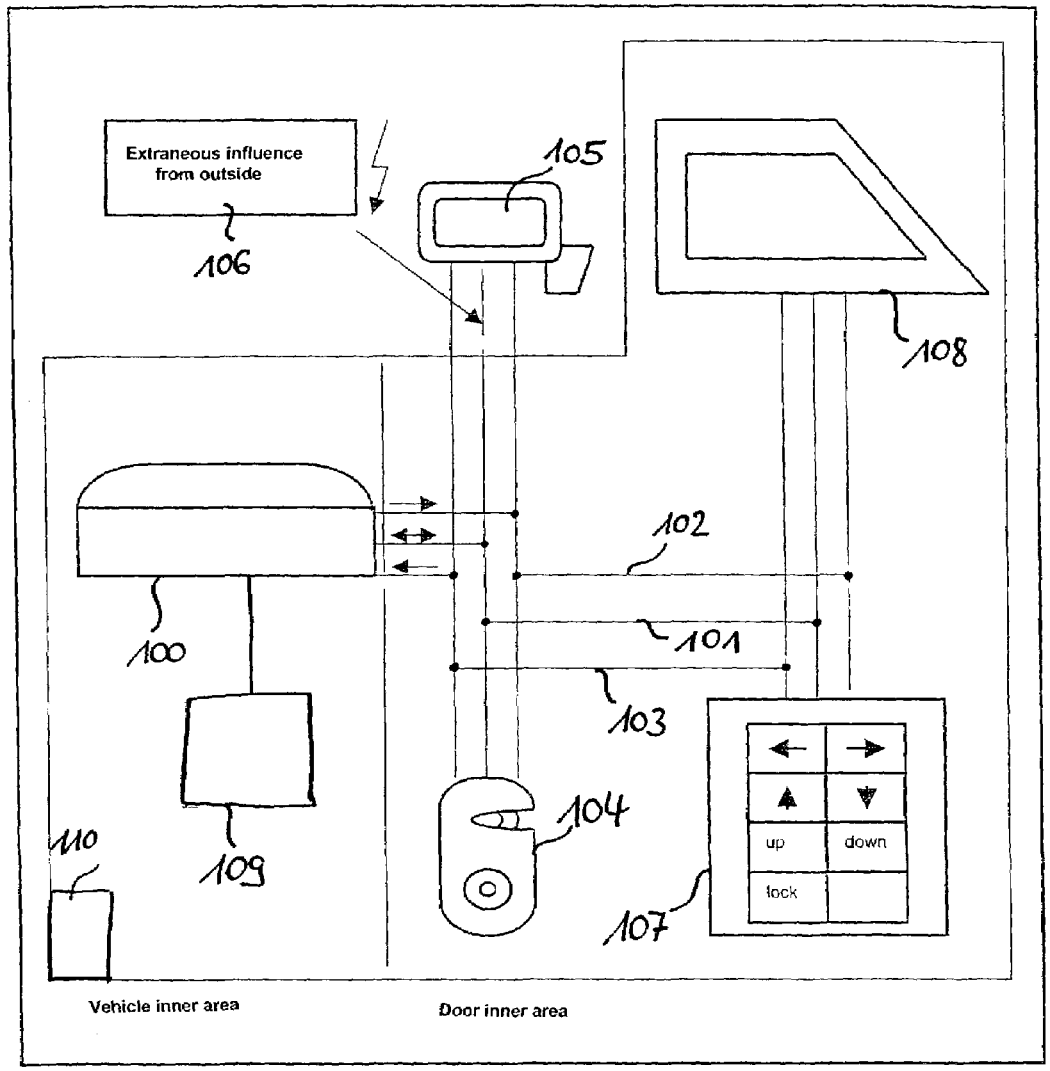

METHOD AND DEVICE AS WELL AS A CONTROL UNIT FOR MONITORING A BUS SYSTEM

FIELD OF THE INVENTION

The present invention relates to a method and a device, as well as a control unit for monitoring a bus system having at least three users in a vehicle having a drive unit and a lockable vehicle area.

BACKGROUND INFORMATION

The networking of control devices, sensors and actuators with the aid of a communications system, i.e., a bus system, has drastically increased in recent years in the construction of modern motor vehicles. Synergy effects due to the distribution of functions among multiple control units or sensors and actuators may thereby be obtained. In this context, one speaks of "distributed systems". Communication between the different users in such distributed systems is taking place more and more via a bus, or rather a bus system. The communications traffic on the bus system, access mechanisms and receiving mechanisms as well as error handling are governed via a protocol.

Future door architectures provide for a networked structure of all electrical components found in it. The lock, mirror, power window unit and operating element, etc. are connected to a bus system and controlled by a central control device or a central control unit. A bus system of this sort includes a data line on which data are exchanged bidirectionally between the connected users.

One example of such a bus system is the LIN (local interconnect network), a master/slave bus whose users are connected via a logical bus line. A maximum of one master and up to 64 slaves belong to each bus. An unshielded physical single-wire line is used as the transmission medium. The LIN protocol divides the transmit and receive process into two tasks. The master task contains the synchronization and addressing, and the slave task contains the data. Both—master task and slave task—are combined in a so-called message frame. A master is able to carry out the master task as well as the slave task. Each data transmission is made up of a message frame in which both the synchronization information and the data information are transmitted. At the start of each message, the master sends a synchronization interruption in the master task, known as a "SynchBreak", in order to fetch the slaves out of a possible idle state and to enable synchronization. Subsequently, this is then followed by pure synchronization information as well as an identifier which uniquely describes the data content of each message frame and also, encoded, reflects the length of the subsequent data.

Like the cited example of the LIN bus, there are a number of bus systems which may be used as a communications link between corresponding users, particularly in these distributed systems in door architectures. In this context, prevention of unauthorized access to these systems is gaining increasing importance. In today's bus systems in motor vehicles, a large part of the data is transmitted unprotected. If the bus line is connected to an unauthorized user, he can send commands that trigger, for example, the unlocking of the central locking system or other closure systems and thus unlocking of the vehicle. A major problem related to break-in prevention is thus that the potential for external energizing of the closure system or the locking system or parts thereof from outside, thus outside of the lockable vehicle interior, is enabled because bus users are arranged outside of this lockable vehicle interior, and opening of the vehicle is enabled via them, i.e. the connecting lines leading there. Locking system or closure system is used to mean all parts that prevent penetration into the passenger compartment or the vehicle area (interior, trunk). Besides locks, this also includes power window units and the associated locking mechanisms, etc.

SUMMARY OF THE INVENTION

An object of the present invention is therefore to provide a method and a device, as well as a control unit to prevent such unauthorized access.

This object is achieved by a method and a device, as well as a control unit for monitoring a bus system having at least three users in a vehicle having a drive unit and a lockable vehicle area; of the at least three users of the bus system, precisely one first user is formed as the superordinate user or master and initiates each data transmission on the bus system; at least one second user is formed as an element of a locking system in a vehicle, and at least one third user is arranged outside of the lockable vehicle area. The first user, i.e. the master or rather the control unit, advantageously monitors the data transmission such that the first user, for each data transmission on the bus system that was not initiated by it itself, introduces measures that prevent transmission of these data.

In an advantageous refinement, the first user, thus the master or rather the control unit, monitors the data transmission such that in at least one specific operating state of the vehicle, the first user, for each data transmission on the bus system, introduces measures that prevent transmission of these data.

In one advantageous embodiment, for each data transmission on the bus system, an identifier is transmitted, the identifier being uniquely assigned to one of the at least three users or being uniquely assigned to the data which may come exclusively from one of the at least three users. In this context, all identifiers are available in the superordinate user, thus to the master, for comparison; if the identifier of a data transmission conforms with an identifier available in the superordinate user, data transmission is prevented by the superordinate user, i.e., the master.

The at least one operating state is advantageously a protected stand-by mode of the vehicle, such that the vehicle, thus particularly the vehicle area, is locked and the drive unit is not in operation. An activity on the bus system, initiated by the master, is not excluded in this case, but rather is generally present.

In one advantageous refinement, the data transmission is prevented in that the data to be transmitted are at least partially destroyed by the superordinate user, thus, the master, i.e. the control unit. In so doing, the data to be transmitted may be destroyed in a practical manner in that the data are overwritten with a data signal that is dominant for the bus system. Likewise, the data to be transmitted may be destroyed by the superordinate user, i.e., the master, in that the entire bus system is tied to ground potential and thus data transmission is blocked.

In an advantageous further development, after a wait time, the superordinate user will lift the blocking of data transmission and monitor again whether a data transmission is taking place that was not initiated by it; in case this happens, the data transmission is blocked again, and in the other case in which data transmission not initiated by the master is not present, the blocking is lifted and a transition is made to normal operation.

In one preferred specific embodiment, the bus system is a LIN bus system.

The stated benefits and features advantageously yield increased break-in prevention and the fact that no electrical opening of the lock is possible from outside. In an advantageous manner, such an external influencing may be forwarded to the alarm system, it then being able to react with an alarm, thus signaling (audibly or visually as well as reporting to a central location via mobile radio).

The described subject matter of the present invention thus makes it possible to prevent external influencing of the door electronics, particularly in a LIN bus system, from outside, and enables its signaling.

BRIEF DESCRIPTION OF THE DRAWING

The FIGURE shows a door architecture in the vehicle inner area, in which the individual users are interconnected via a bus line, i.e., a bus system.

DETAILED DESCRIPTION

The FIGURE shows a control device 100 installed in the vehicle area or rather vehicle inner area, as well as bus users—a lock 104, a power window unit 108 and an operating element 107—installed in the door inner area, and thus likewise in the vehicle inner area. A mirror 105 is installed in the outer area of the vehicle. These users 100, 104, 105, 107 and 108 are interconnected via a data line, i.e., a bus 101.

In the same way, it is proposed to interconnect them via a common ground line 103 and a common voltage supply $U_{bat}$ 102.

In this context, the data line is configured particularly bidirectionally, thereby enabling direct data exchange between control device 100 and individual elements 105, 104, 107 and 108. The communication on bus 101 is initiated by control unit 100, which here represents the bus master; that is to say, a message frame is started with a synchronization signal, or SynchBreak in the LIN bus application, by the control unit. In the respective slave task of the respective bus user, it then transmits data to the master, thus control unit 100.

In such a networked structure as shown here by way of example, since the mirror is connected to the lock via a bus system, it is possible to detach the mirror as a bus user located outside the vehicle inner area, and thus obtain access to the line system, particularly the data line or bus 101, in the door. This is shown with block 106. Besides a mirror as an external bus user, trailer couplers or connections to the trailer, electrical antennae or similar items are conceivable as a launching point for unauthorized access.

In this context, besides lock 104, a power window unit 108 and associated operating element 107 with locking mechanism and the like are equally considered as part of the locking system; thus, everything that prevents access into the vehicle area, particularly the vehicle interior.

If, at this point, a data transmission occurs that was not initiated by the master (recognizable in LIN by, say, a SychBreak this can only mean that an extraneous influence from outside is present. As a result, data transmission is prevented by the master. For example, it may dominantly overwrite the data signal it did not initiate, partially destroy it, invalidate it in another way or produce a blocking such that data line 101 is tied to ground 103. Following a wait time, a new check is then made as to whether an unauthorized data transmission is present on the bus system. If this is the case, the blocking is maintained; if this is not the case, the blocking is lifted and the ground connection is cut. The present invention thus enables monitoring of the data line from central control device or rather central control unit 100 to the terminal units in the door. If an external electronic device now attempts to produce a data transmission on the bus, the data communication is blocked from control device or control unit 100.

A LIN bus application in particular is a master/slave application, the control unit here, as stated, representing the master and the distributed electronics (lock, power window unit, mirror, operating element) being configured as slaves. If a slave is to be triggered, only the master is able to do this.

If a master needs data from a slave, this is possible only through a query it makes itself. If the vehicle is now left in a specific operating state, precisely in a so-called protected stand-by mode, thus with a locked vehicle inner area and non-activated drive unit 110, only bus users in the vehicle inner area are queried for status through initiation of communication by the master, i.e., control unit 100. In a special case of a parked and locked vehicle, the lock is the only bus user which is cyclically triggered in order to inform the master of a mechanical unlocking or of its instantaneous status for the alarm system function with regard to alarm system 109. Then, any signal that does not correspond to the queried lock signal or the queried signals of the remaining inner area users, thus, for example, from the mirror recognizable due to the identifier, is suppressed or destroyed, e.g., through dominant overwriting and/or tying the bus line to ground potential.

The serial data input/output port of a microcontroller in control unit 100 is able, moreover, to listen to the data bus line preferably during the data transmission pauses, thus in the pauses in which no data transmission initiated by it is occurring. On the LIN bus, for example, this is the interframe space. It then recognizes undesirable signal changes on the bus. In this form of listening to the data transmission pauses, this can mean that, given signal changes, an unauthorized access is occurring.

Furthermore, if a received data word corresponds to that of an address of a load connected to the bus, then this can clearly only be an instance of external influencing of the system. In this case, the control device is able to actively tie the bus line to ground potential. Data transmission on the bus is now no longer possible. Thus, the lock can no longer be electrically unlocked. A message may be sent to alarm system 109 that a break-in attempt is underway, thereby entailing a corresponding reaction by the alarm system.

After a wait time, the control device in the bus may then be queried regarding a signal change. If no change is recognized, the blocked state is retained. If communication is again possible between the master and the slaves, the control unit may switch back over to normal operation, i.e., cancel the blocking.

What is claimed is:

1. A method for monitoring a bus system having at least three users in a vehicle having a drive unit and a lockable vehicle area, comprising:
    forming precisely one first user of the at least three users as a superordinate user;
    initiating each data transmission on the bus system;
    forming at least one second user as an element of a locking system in the vehicle; and arranging at least one third user outside of the lockable vehicle area, wherein:
the first user monitors the data transmission such that the first user, for each data transmission on the bus system that was not initiated thereby, introduces a measure to prevent transmission of the data;
the data transmission is prevented in that the data to be transmitted are at least partially destroyed by the superordinate user; and
the data to be transmitted are destroyed by the superordinate user in that the bus system is tied to ground potential and the data transmission is thus blocked;
wherein after a wait time, the superordinate user cancels a blocking of the data transmission and again monitors whether the data transmission is taking place that was not initiated thereby, and the data transmission then is blocked once more, otherwise the blocking being canceled.

2. The method as recited in claim 1, wherein:
for each data transmission on the bus system, an identifier is transmitted,
each identifier is uniquely assigned to one of the at least three users,
each identifier is available in the superordinate user for comparison, and
in case of conformance of the identifier of the data transmission with the identifier available in the superordinate user, the data transmission is prevented by the superordinate user.

3. The method as recited in claim 1, wherein at least one operating state corresponds to a protected stand-by mode of the vehicle such that the vehicle is locked and the drive unit is not in operation.

4. The method as recited in claim 1, wherein:
the first user monitors the bus system for a signal change in a data transmission pause, and
upon occurrence of the signal change, the first user introduces the measure accordingly.

5. The method as recited in claim 1, wherein:
the bus system includes a local interconnect network (LIN) bus system.

6. The method as recited in claim 1, wherein:
in case of prevention of the data transmission on the bus system by the first user, the prevention is communicated to an alarm system in the vehicle.

7. A device for monitoring a bus system having at least three users in a vehicle having a drive unit and a lockable vehicle area, comprising:
an arrangement for forming precisely one first user of the at least three users as a superordinate user;
an arrangement for initiating each data transmission on the bus system;
an arrangement for forming at least one second user as an element of a locking system in the vehicle; and
an arrangement for arranging at least one third user outside of the lockable vehicle area, wherein:
the first user monitors the data transmission such that the first user, for each data transmission on the bus system that was not initiated thereby, introduces a measure to prevent transmission of the data;
the data transmission is prevented in that the data to be transmitted are at least partially destroyed by the superordinate user; and
the data to be transmitted are destroyed by the superordinate user in that the bus system is tied to ground potential and the data transmission is thus blocked;
wherein after a wait time, the superordinate user cancels a blocking of the data transmission and again monitors whether the data transmission is taking place that was not initiated thereby, and the data transmission then is blocked once more, otherwise the blocking being canceled.

8. A control unit for monitoring a bus system having at least three users in a vehicle having a drive unit and a lockable vehicle area, comprising:
an arrangement for forming the control unit as precisely one first user of the at least three users corresponding to a superordinate user;
an arrangement for initiating each data transmission on the bus system;
an arrangement for forming at least one second user as an element of a locking system in the vehicle; and
an arrangement for arranging at least one third user outside of the lockable vehicle area, wherein:
the control unit monitors the data transmission such that the control unit, for each data transmission on the bus system that was not initiated thereby, introduces a measure to prevent transmission of the data;
the data transmission is prevented in that the data to be transmitted are at least partially destroyed by the superordinate user; and
the data to be transmitted are destroyed by the superordinate user in that the bus system is tied to ground potential and the data transmission is thus blocked;
wherein after a wait time, the superordinate user cancels a blocking of the data transmission and again monitors whether the data transmission is taking place that was not initiated thereby, and the data transmission then is blocked once more, otherwise the blocking being canceled.

* * * * *